(12) United States Patent
Piskunov et al.

(10) Patent No.: US 10,605,968 B2
(45) Date of Patent: Mar. 31, 2020

(54) IMAGING SYSTEM

(71) Applicant: Samsung Electronics Co., Ltd., Suwon-si, Gyeonggi-do (KR)

(72) Inventors: Dmitriy Evgenievich Piskunov, Moscow (RU); Jae-yeol Ryu, Moscow (RU); Nikolay Viktorovich Muravev, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 245 days.

(21) Appl. No.: 15/850,111

(22) Filed: Dec. 21, 2017

(65) Prior Publication Data
US 2018/0188426 A1     Jul. 5, 2018

(30) Foreign Application Priority Data

Dec. 29, 2016  (RU) ................................. 2016152506
Nov. 19, 2017  (KR) ........................ 10-2017-0148714

(51) Int. Cl.
| | |
|---|---|
| *G02B 26/02* | (2006.01) |
| *G02B 5/136* | (2006.01) |
| *G02B 5/128* | (2006.01) |
| *G02B 5/132* | (2006.01) |
| *G09G 3/00* | (2006.01) |
| *G02B 27/28* | (2006.01) |
| *G02B 27/10* | (2006.01) |

(Continued)

(52) U.S. Cl.
CPC ............. *G02B 5/136* (2013.01); *G02B 5/128* (2013.01); *G02B 5/132* (2013.01); *G09G 3/007* (2013.01); *G02B 27/10* (2013.01); *G02B 27/2264* (2013.01); *G02B 27/283* (2013.01); *G02B 2027/0134* (2013.01); *G09G 2340/0457* (2013.01)

(58) Field of Classification Search
CPC ........ G02B 5/136; G02B 5/132; G02B 5/128; G02B 2027/0134; G02B 27/2264; G02B 27/10; G02B 27/283; G02B 26/02; G02B 27/0172; G09G 3/007; G09G 2340/0457
USPC ....................................................... 359/227
See application file for complete search history.

(56) References Cited

U.S. PATENT DOCUMENTS

| | | |
|---|---|---|
| 5,748,799 A | 5/1998 | Shimura |
| 6,239,908 B1 | 5/2001 | Kelly |
| 6,249,289 B1 | 6/2001 | Arnaud et al. |

(Continued)

FOREIGN PATENT DOCUMENTS

| | | |
|---|---|---|
| CN | 101751654 A | 6/2010 |
| EP | 2174513 B1 | 5/2014 |

(Continued)

OTHER PUBLICATIONS

Extended European Search Report dated Dec. 16, 2019, issued in European Patent Application No. 17886621.6.

*Primary Examiner* — Euncha P Cherry
(74) *Attorney, Agent, or Firm* — Jefferson IP Law, LLP

(57) ABSTRACT

An imaging system is provided. The imaging system includes a display including a first display half screen and a second display half screen, a retroreflective device provided on the display, a first beam splitter facing the first display half screen, a second beam splitter facing the second display half screen, a first optical shutter located on a surface of the first beam splitter, and a second optical shutter located on a surface of the second beam splitter.

21 Claims, 7 Drawing Sheets

(51) Int. Cl.
*G02B 27/22* (2018.01)
*G02B 27/01* (2006.01)

(56) References Cited

U.S. PATENT DOCUMENTS

| | | |
|---|---|---|
| 7,097,311 B2 | 8/2006 | Jaynes et al. |
| 9,529,194 B2 | 12/2016 | Yoo et al. |
| 2004/0150888 A1 | 8/2004 | Domjan et al. |
| 2004/0239885 A1 | 12/2004 | Jaynes et al. |
| 2010/0002154 A1* | 1/2010 | Hua ............ G02B 27/0172 349/11 |
| 2010/0253915 A1 | 10/2010 | Gao et al. |
| 2014/0340424 A1 | 11/2014 | Ellsworth |

FOREIGN PATENT DOCUMENTS

| | | |
|---|---|---|
| EP | 3 032 300 A1 | 6/2016 |
| JP | 2004258332 A | 9/2004 |
| KR | 10-2015-0059085 A | 5/2015 |
| RU | 2402070 C2 | 10/2010 |
| WO | 2008-082109 A1 | 7/2008 |

* cited by examiner

IMAGING SYSTEM

CROSS-REFERENCE TO RELATED APPLICATION(S)

This application claims the benefit under 35 U.S.C. § 119(a) of a Russian patent application filed on Dec. 29, 2016 in the Russian Federal Service for Intellectual Property and assigned Serial number 2016152506, and of a Korean patent application filed on Nov. 9, 2017 in the Korean Intellectual Property Office and assigned Serial number 10-2017-0148714, the entire disclosure of each of which is hereby incorporated by reference.

TECHNICAL FIELD

The present disclosure relates to imaging technology. More particularly, the present disclosure relates to imaging systems for creating high-resolution images without a screen-door effect.

BACKGROUND

It is known that the maximum resolution of the human eye is about 60 pixels per degree, which is enough for a viewer to comfortably view virtual content on existing smartphone displays, monitor displays, or television (TV) displays. This is because the visual content displayed on these displays is seen by the human eye within a small field of view (FOV).

However, one problem is raised when a viewer desires to use virtual reality (VR) devices, such as VR glasses or VR helmets, because displays of VR devices have optical systems providing a larger FOV than that of optical systems according to the related art. The overall VR system resolution of VR devices is not more than 15 pixels per degree, which is not enough for the human eye. Thus, images generated by VR devices usually have a low resolution.

Another problem is that the images displayed on the displays of VR devices often have a visual artifact characterized by the presence of visible fine lines separating pixels on each image. This artifact is commonly referred to as a screen-door effect because the viewer feels like he/she is looking at an image through a mesh screen formed by the fine lines. The screen-door effect occurs when the image is scaled so big that the viewer is able to see a space between light-emitting diodes (LEDs) forming a display pixel structure. For example, the images generated by VR devices cause the screen-door effect.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide imaging systems for obtaining high-resolution images without a screen-door effect.

Additional aspects will be set forth in part in the description which follows and, in part, will be apparent from the description, or may be learned by practice of the presented embodiments.

In accordance an aspect of the present disclosure, an imaging system is provided. The imaging system includes a display including a first display half screen and a second display half screen, a retroreflective unit provided on the display, a first beam splitter facing the first display half screen, a second beam splitter facing the second display half screen, a first optical shutter located on a surface of the first beam splitter, and a second optical shutter located on a surface of the second beam splitter, wherein the imaging system is configured to alternately operate in a first mode and a second mode, wherein, in the first mode, the first optical shutter is opened and the second optical shutter is closed, wherein the display is configured to output first light beams characterizing a first image from the first display half screen, and output, from the second display half screen, second light beams characterizing a second image shifted relative to the first image, wherein the retroreflective device is configured to transmit the first light beams toward a first eye, and reflect the second light beams toward the first eye, thereby merging the first and second images characterized by the first light beams and the second light beams into an image for the first eye, wherein, in the second mode, the first optical shutter is closed and the second optical shutter is opened, wherein the display is configured to output the first light beams from the second display half screen, and output the second light beams from the first display half screen, and wherein the retroreflective device is configured to transmit the first light beams toward a second eye, and reflect the second light beams toward the second eye, thereby merging the first and second images characterized by the first light beams and the second light beams into an image for the second eye.

The imaging system may further include a relay lens located between the first beam splitter and the second beam splitter.

The relay lens may include a pair of lenses disposed symmetrically to each other.

The shifted second image may be shifted upward, downward, leftward, rightward, or diagonally relative to the first image.

The shifted second image may be shifted by a sub-pixel of the display relative to the first image.

The retroreflective device may be any one of a sheet-type retroreflector and a diffuser.

The sheet-type retroreflector may include a plastic substrate, a semitransparent mirror coating provided on the plastic substrate, and a plastic cover layer covering the semitransparent mirror coating.

The semitransparent mirror coating may be configured as a curved layer including semicircular cavities each filled with a glass ball serving as a lens.

The semitransparent mirror coating may be configured as a curved layer including a plurality of embossed prisms on a surface of the semitransparent mirror coating, the surface facing the plastic substrate.

The sheet-type retroreflector may include one glass or polymer layer including a plurality of truncated prisms or double-truncated prisms.

The imaging system may further include a first focusing lens facing the first optical shutter and a second focusing lens facing the second optical shutter.

In accordance with another aspect of the present disclosure, an imaging system is provided. The imaging system includes a display including a first display half screen and a second display half screen, a retroreflective device provided on the display, a first polarization beam splitter facing the first display half screen and electrically operable in a mirroring state or a transparent state, and a second polarization beam splitter facing the first display half screen and electrically operable in the mirroring state or the transparent state, wherein the imaging system is configured to alternately operate in a first mode and a second mode, wherein, in the first mode, the first polarization beam splitter is in the transparent state and the second polarization beam splitter is in the mirroring state, wherein the display is configured to output, from the first display half screen, first light beams characterizing a first image, and output, from the second display half screen, second light beams characterizing a second image shifted relative to the first image, wherein the retroreflective device is configured to transmit the first light beams toward a first eye, and reflect the second light beams toward the first eye, thereby merging the first and second images characterized by the first light beams and the second light beams into an image for the first eye, wherein, in the second mode, the first polarization beam splitter is in the mirroring state and the second polarization beam splitter is in the transparent state, the display is further configured to output the first light beams from the second display half screen, and output the second light beams from the first display half screen, and wherein the retroreflective device is further configured to transmit the first light beams toward a second eye, and reflect the second light beams toward the second eye, thereby merging the first and second images characterized by the first light beams and the second light beams into an image for the second eye.

In accordance with another aspect of the present disclosure, an imaging system is provided. The imaging system includes a display including a first display half screen and a second display half screen configured to alternately emit first light beams and second light beams, a retroreflective device provided on the display, a retarder provided on the retroreflective device and electrically operable to provide a first or second polarization state of the first light beams and of the second light beams, a first polarization beam splitter facing the first display half screen and configured to transmit or reflect the first or second light beams depending on which light beams from among the first and second light beams are in the first or second polarization state, and a second polarization beam splitter facing the second display half screen and configured to transmit or reflect the first or second light beams depending on which light beams from among the first and second lights are in the first or second polarization state, wherein the imaging system is configured to alternately operate in a first mode and a second mode, wherein, in the first mode, the first light beams characterize a first image and the second light beams characterize a second image shifted relative to the first image, wherein the display is further configured to output the first light beams from the first display half screen, and output the second light beams from the second display half screen, wherein the retarder operates such that the first light beams are in the first polarization state and the second light beams are in the second polarization state, wherein the retroreflective device is further configured to transmit the first light beams toward a first eye and to reflect the second light beams toward the first eye, thereby merging the first and second images characterized by the first light beams and the second light beams into an image for the first eye, wherein in the second mode, the display is further configured to output the second light beams from the first display half screen, and output the first light beams from the second display half screen, wherein the retarder operates such that the first light beams are in the second polarization state and the second light beams are in the first polarization state, and wherein the retroreflective device is configured to transmit the first light beams toward a second eye, and reflect the second light beams toward the second eye, thereby merging the first and second images characterized by the first light beams and the second light beams into an image for the second eye.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
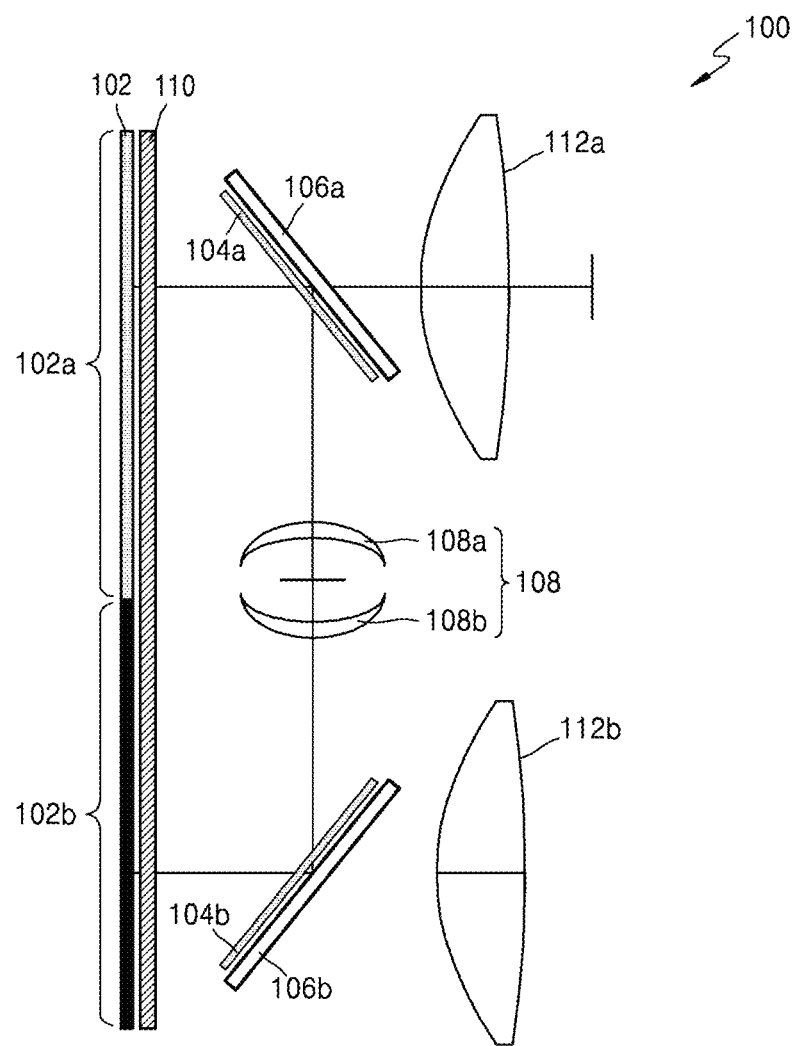
FIG. 1 is a schematic view of an imaging system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

However, embodiments of the present disclosure may be embodied in many other forms and should not be construed as limited to any certain structure or function presented in the following description. In contrast, these embodiments are provided to make the description of the present disclosure detailed and complete. According to the present description, it will be apparent to one of ordinary skill in the art that the scope of the present disclosure covers any embodiment, which is disclosed herein, irrespective of whether this embodiment is implemented independently or in concert with any other embodiment. For example, a system disclosed herein may be implemented in practice by using any number of the embodiments provided herein. Furthermore, it should be understood that any embodiment may be implemented using one or more of elements presented in the appended claims.

When used herein, terms, such as "comprise", "include", and "have" specify the presence of stated features (e.g., values, functions, operations, parts, elements, and components) but do not preclude the presence or addition of one or more other features.

As used herein, expressions, such as "A or B", "at least one of A and/or B", and "one or more of A and/or B" may include any and all combinations of one or more of the associated listed items. For example, "A or B", "at least one of A and B", or "at least one of A or B" may denote all of the cases of (1) including at least one A, (2) including at least one B, and (3) including at least one A and at least one B.

Terms, such as "first" and "second" used herein may modify various elements or components regardless of their order and/or importance. These terms may be used only to distinguish one element or component from another element or component, and these elements or components should not be limited by these terms. For example, a first user device and a second user device may refer to different user devices regardless of their order or importance. For example, without departing from the scope of the present disclosure, a first component may be termed a second component, and similarly, a second component may be termed a first component.

It will be understood that when a component (e.g., a first component) is referred to as being "(operatively or communicatively) coupled to/with" or "connected to/with" another component (e.g., a second component), it may be coupled to/with or connected to/with the other component directly or indirectly through one or more other components (e.g., third components). On the other hand, when a component (e.g., a first component) is referred to as being "directly coupled to/with" or "directly connected to/with" another component (e.g., a second component), no other components (e.g., third components) exist therebetween.

The expression "configured to (or set to)" used herein may be replaced with, for example, "suitable for," "having the capacity to," "designed to," "adapted to," "made to," or "capable of" according to cases. The expression "configured to (or set to)" may not necessarily mean "specifically designed to" in a hardware level. Instead, in some cases, the expression "apparatus configured to . . . " may mean that the apparatus is "capable of . . . " along with other devices or parts.

As used herein, the term "and/or" includes any and all combinations of one or more of the associated listed items. Expressions, such as "at least one of", when preceding a list of elements, modify the entire list of elements and do not modify the individual elements of the list.

FIG. 1 is a schematic view of an imaging system according to an embodiment of the present disclosure.

Referring to FIG. 1, an imaging system 100 may include a display 102, a first beam splitter 104a, a second beam splitter 104b, a first optical shutter 106a, and a second optical shutter 106b.

The imaging system 100 may further include a relay lens 108, a retroreflective unit 110, a first focusing lens 112a, and a second focusing lens 112b. Each element will now be described below.

The display 102 may be any of commercially available displays used in electronic devices, such as liquid crystal displays (LCDs), displays based on light-emitting diodes (LEDs), or displays based on an organic light-emitting diodes (OLEDs). The display 102 may include a first display half screen 102a and a second display half screen 102b. The first display half screen 102a and the second display half screen 102b may be formed by dividing a display screen along a transverse line that goes through a display screen center. The display 102 may be configured to display a first image on the first display half screen 102a and to display a second image, which is different from the first image, on the second display half screen 102b. For example, the first and second images may be shifted by a sub-pixel relative to each other. Due to the sub-pixel shift, for example, pixels of the second image may be substantially located between pixels of the first image. Accordingly, the second image may be superimposed on the first image, thereby increasing a pixel density.

Figure 4:
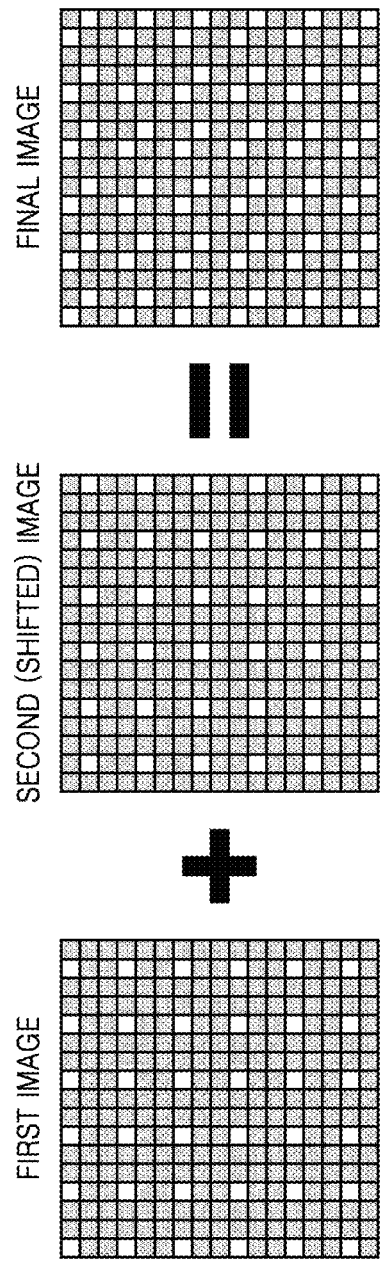
FIG. 4 illustrates an image superimposition performed by an imaging system according to an embodiment of the present disclosure.

FIG. 4 illustrates an image superimposition performed by an imaging system according to an embodiment of the present disclosure. Specifically, FIG. 4 illustrates a final image obtained by combining the first image and the shifted second image.

Referring to FIG. 4, pixels are shown as white squares and gaps between the pixels are shown as black squares.

As shown in FIG. 1, the display 102 may be configured to output first light beams characterizing the first image from the first display half screen 102a and to output second light beams characterizing the second image (sub-pixel shifted image) from the second display half screen 102b. In another embodiment, the first image may also be shifted relative to a desired original image. In this case, the second image may remain shifted by the same sub-pixel relative to the first image. It will be apparent to one of ordinary skill in the art that the second image may be shifted upward, downward, leftward, rightward, or diagonally relative to the first image. Also, in another embodiment, it will be apparent to one of ordinary skill in the art that the opposite situation is possible, i.e., the first image may be moved relative to the second image, without leading to any principal change in an operation of the imaging system 100.

The display 102 may be implemented as a multi-screen display including at least two adjacent displays in order to reduce an overall size of the imaging system 100. For example, the display 102 may include the first display half screen 102a and the second display half screen 102b.

The first and second beam splitters 104a and 104b, the first and second optical shutters 106a and 106b, and first and second relay lenses 108a and 108b may constitute a relay unit used in the imaging system 100 to propagate the second light beams from the second display half screen 102b to the first display half screen 102a and vice versa (operation modes of the imaging system 100 will be explained below). The first beam splitter 104a may be located near the first display half screen 102a, and the second beam splitter 104b may be located near the second display half screen 102b. For example, the first beam splitter 104a may be obliquely inclined with respect to the first display half screen 102a to face the first display half screen 102a, and the second beam splitter 104b may be obliquely inclined with respect to the second display half screen 102b to face the second display half screen 102b. The first optical shutter 106a may be attached to the first beam splitter 104a, and the second optical shutter 106b may be attached to the second beam splitter 104b.

The relay lens 108 may be symmetrical and may include one or more lenses. For example, the relay lens 108 may include the first and second relay lenses 108a and 108b. The first and second relay lenses 108a and 108b may be located between the first and second beam splitters 104a and 104b. For example, the first and second relay lenses 108a and 108b may be made as at least one symmetrical lens, Fresnel lens, diffraction optical element, or holographic optical element.

Each of the first and second beam splitters 104a and 104b may be a spherical beam splitter.

Each of the first and second beam splitters 104a and 104b may be a semitransparent mirror or partially transmissive mirror, a beam splitting cube, reflector, or plate, a holographic beam splitter, or a polarization beam splitter.

Each of the first and second optical shutters 106a and 106b may be configured as an optical device capable of being in two states (i.e., closed and opened states) in order to control light transmission. Types of optical shutters are widely known in the art, and thus, a detailed explanation thereof will not be given. The relay unit may have low costs, a light weight, and easy implementation when compared to other options. Each of elements of the first and second beam splitters 104a and 104b, the first and second optical shutters 106a and 106b, and the first and second relay lenses 108a and 108b may be formed of optical glass, optical crystals, or a polymer as apparent to one of ordinary skill in the art. Also, the semitransparent mirror is a particular example of the beam splitter, and in other embodiments, each or both of the first and second beam splitters 104a and 104b may include partially transmissive mirrors or reflectors, plates, holographic beam splitters, or polarization beam splitters.

The retroreflective unit 110 may be provided on the display 102. Although the retroreflective unit 110 is provided on the first display half screen 102a and the second display half screen 102b in FIG. 1, embodiments are not limited thereto and the retroreflective unit 110 may be provided only on one of the first display half screen 102a and the second display half screen 102b. The retroreflective unit 110 may be manufactured as a sheet-type retroreflector or a diffuser. It is more preferable to manufacture the retroreflective unit 110 as a sheet-type retroreflector because the sheet-type reflector reflects rays in a narrow angle range whereas the diffuser reflects rays in a hemispherical shape. Accordingly, sheet-type retroreflectors according to embodiments will now be explained with reference to FIGS. 5A, 5B, 5C, and 5D.

Figure 5A:
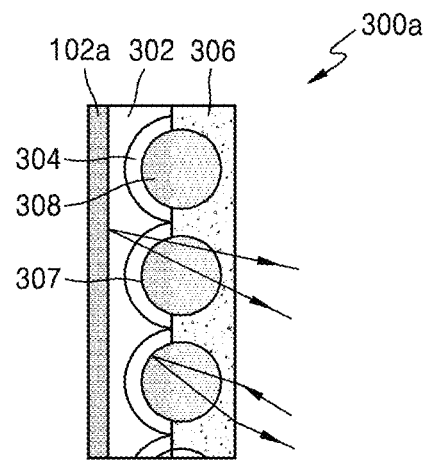
FIGS. 5A, 5B, 5C, and 5D illustrate retroreflective units used in an imaging system according to various embodiments of the present disclosure.

FIG. 5A illustrates a retroreflector 300a that uses a semitransparent mirror coating 304 according to an embodiment of the present disclosure.

Referring to FIG. 5A, the retroreflector 300a may include a plastic substrate 302, the semitransparent mirror coating 304 provided on the plastic substrate 302, and a plastic cover layer 306 covering the semitransparent mirror coating 304. The plastic substrate 302 may be provided on the first display half screen 102a.

Referring to FIG. 5A, the semitransparent mirror coating 304 may be made as a curved layer having semicircular cavities 307. A glass ball 308 serving as a lens may be filled in each of the cavities 307.

Figure 5B:
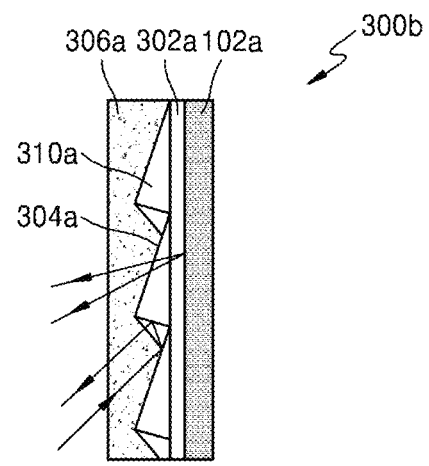

FIG. 5B is a schematic view of an imaging system according to an embodiment of the present disclosure.

Referring to FIG. 5B, a plastic substrate 302a may be provided on the first display half screen 102a, and a semitransparent mirror coating 304a may be provided on the plastic substrate 302a. The semitransparent mirror coating 304a may be made as a curved layer having a plurality of prisms 310a on a surface facing the plastic substrate 302, and a retroreflector 300b may include a plastic cover layer 306a covering the semitransparent mirror coating 304a. The prisms 310a may be embossed. In this embodiment, when it is assumed that the second image displayed on the second display half screen 102b and superimposed on the first image displayed on the first display half screen 102a is a shifted image, the light beams from the first display half screen 102a will pass through the retroreflector 300a or 300b whereas the second light beams from the second display half screen 102b will be returned, that is, reflected from the retroreflector 300a or 300b. The reflection of the second light beams may be considered as if there are additional (virtual) pixels provided on the first display half screen 102a and emitting the second light beams. In this regard, when the first light beams and the second light beams are combined with each other, the first light beams and the second light beams may form a final high-resolution image without a screen-door effect.

Figure 5C:
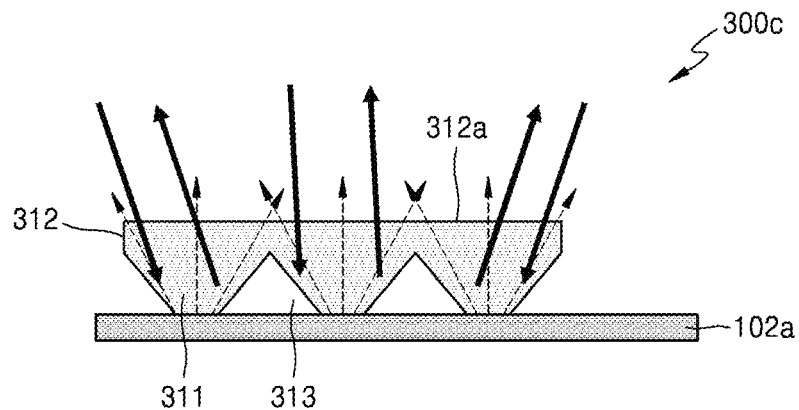
Figure 5D:
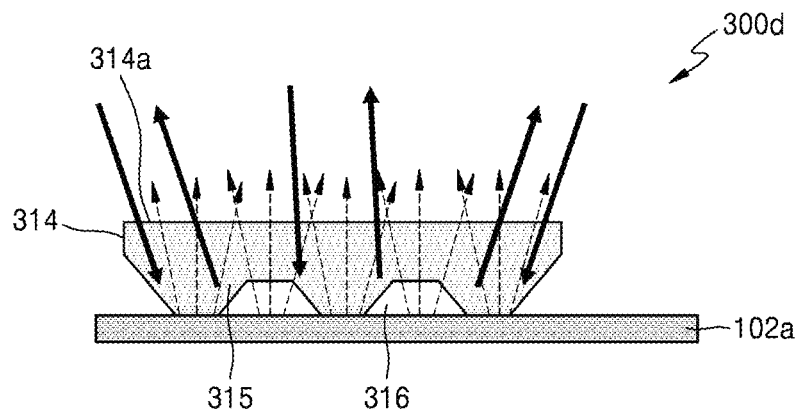

FIGS. 5C and 5D illustrate retroreflectors that are sheet-type retroreflectors and do not use semitransparent mirror coatings according to various embodiments of the present disclosure.

Referring to FIG. 5C, a retroreflector 300c may include one layer 312 having a plurality of truncated prisms 311. The layer 312 may be provided on the first display half screen 102a, the plurality of truncated prisms 311 may contact a surface of the first display half screen 102a, and a flat surface 312a of the layer 312 may be located outside the first display half screen 102a. Cavities 313 surrounded by the plurality of truncated prisms 311 and the first display half screen 102a may be formed.

Referring to FIG. 5D, a retroreflector 300d may include one layer 314 having a plurality of double-truncated prisms 315. Although FIGS. 5C and 5D respectively illustrate three truncated prisms 311 and three double-truncated prisms 315, it will be understood by one of ordinary skill in the art that embodiments are not limited thereto and the number of the truncated prisms 311 or the double-truncated prisms 315 may be less or more than 3, if necessary. The plurality of double-truncated prisms 315 contact the first display half screen 102a, and a flat surface 314a of the layer 314 faces outward. Cavities 316 surrounded by the plurality of double-truncated prisms 315 and the first display half screen 102a may be formed.

The second light beams from the second display half screen 102b may be reflected due to total reflection at an interface between an optical material (e.g., optical glass) of the layer 312 or 314 and air between the cavities 313 or 315 of the truncated prisms 311 or the double-truncated prisms 315. The first light beams from the first display half screen 102a may pass through the layer 312 or 314 without total internal reflection. The truncated prisms 311 or the double-truncated prisms 315 may be machined by using well-known technologies, such as micro-machining, printing, etching, and molding.

Referring back to FIG. 1, as shown in FIG. 1, each of the first and second focusing lenses 112a and 112b is an eyepiece intended to transmit an image (or light beams characterizing the image) from a given distance to the human eye. One of ordinary skill in the art may easily realize other configurations of the eyepiece, which all should follow the principle of the present disclosure. The first and second focusing lenses 112a and 112b may be located in front of the display 102 so that the first and second beam splitters 104a and 104b are located between the display 102 and the first and second focusing lenses 112a and 112b.

The operation modes of the imaging system 100 will now be described below.

The imaging system 100 may alternately operate in a first mode and a second mode as follows.

In the first mode (as shown in FIG. 1), the first optical shutter 106a may be opened and the second optical shutter 106b may be closed. The display 102 may be configured to output the first light beams characterizing a predetermined image (e.g., the first image) from the first display half screen 102a and to output the second light beams characterizing a shifted image (e.g., the second image) from the second display half screen 102b. As described above, the shifted image may be an image shifted by a sub-pixel relative to the first image. The second beam splitter 104b may be configured to reflect the second light beams from the second display half screen 102b toward the first and second relay lenses 108a and 108b. The first and second relay lenses 108a and 108b may be configured to direct the second light beams toward the first beam splitter 104a. The retroreflective unit 110 may be configured to transmit therethrough the first light beams from the first display half screen 102a and to reflect the second light beams toward a first eye through the opened first optical shutter 106a and the eyepiece (i.e., the first focusing lens 112a).

In the second mode, the first optical shutter 106a may be closed and the second optical shutter 106b may be opened. The display 102 may be configured to output the first light beams from the second display half screen 102b and to output the second light beams from the first display half screen 102a. The first beam splitter 104a may be configured to reflect the second light beams to the first and second relay lenses 108a and 108b. The first and second relay lenses 108a and 108b may be configured to direct the second light beams toward the second beam splitter 104b. The second beam splitter 104b may be configured to sequentially reflect the second light beams toward the retroreflective unit 110. The retroreflective unit 110 may transmit therethrough the first light beams from the second display half screen 102b and may reflect the second light beams toward a second eye through the closed second optical shutter 106b and the eyepiece (i.e., the second focusing lens 112b).

FIG. 1 illustrates an operation of the imaging system 100 in the first mode. However, since there is no principal difference between the first mode and the second mode, FIG. 1 may be used for describing the second mode too if one mentally turns the figure so that the first display half screen 102a is located below the second display half screen 102b. In this case, light beams will propagate in the opposite direction, i.e., vertically downward.

Accordingly, during the first mode, the first light beams emitted by pixels of the first display half screen 102a and the second light beams emitted by virtual pixels of the first display half screen 102a may be combined to form a final high-resolution image for the first eye (e.g., the left eye). Likewise, during the second mode, the first light beams emitted by pixels of the second display half screen 102b and the second light beams emitted by virtual pixels of the second display half screen 102b may be combined to form the final high-resolution image for the second eye (e.g., the right eye). In other words, both eyes may see the high-resolution image without a screen-door effect.

In another embodiment, the imaging system 100 may be used without the first and second optical shutters 106a and 106b. In this case, the first and second relay lenses 108a and 108b may have a magnifying power of 1, and images from the first and second display half screens 102a and 102b may be simultaneously formed for each human eye. The display 102 may be configured to output the first light beams characterizing a predetermined image (e.g., the first image) from the first display half screen 102a and to output the second light beams characterizing a shifted image (e.g., the second image). Simultaneously, the display 102 may be configured to output the first light beams from the second display half screen 102b and to output the second light beams characterizing a shifted image from the first display half screen 102a. As described above, the shifted image may be an image shifted by a sub-pixel relative to the predetermined image. The second beam splitter 104b may be configured to reflect the second light beams from the second display half screen 102b toward the first and second relay lenses 108a and 108b and simultaneously to transmit the second light beams to the eyepiece (i.e., the second focusing lens 112b). The first and second relay lenses 108a and 108b may be configured to direct the second light beams to the first beam splitter 104a and to direct the first light beams to the second beam splitter 104b. The first beam splitter 104a may be configured, in turn, to reflect the second light beams toward the retroreflective unit 110 and simultaneously to transmit the first light beams to the eyepiece (i.e., the first focusing lens 112a). The retroreflective unit 110 may transmit therethrough the first light beams from the first display half screen 102a and reflect the second light beams to the first eye through the eyepiece (i.e., the first focusing lens 112a), and simultaneously may transmit therethrough the second light beams from the second display half screen 102b and reflect the first light beams toward the second eye through the eyepiece (i.e., the second focusing lens 112b).

Figure 6:
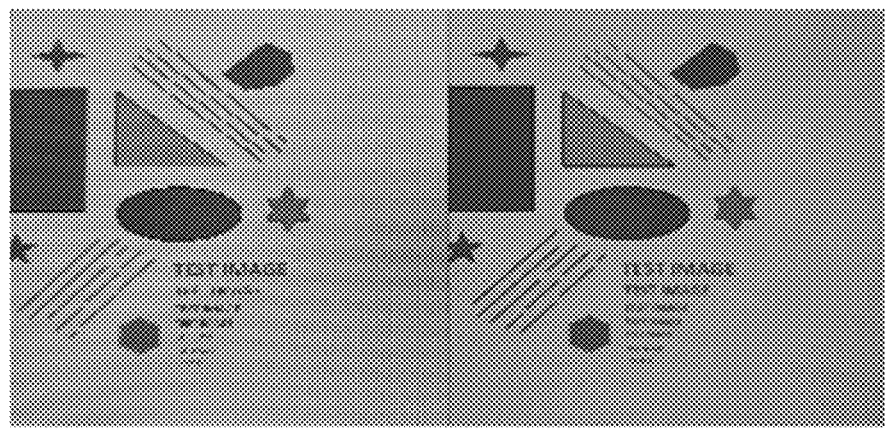
FIG. 6 illustrates a result of an image superimposition performed by an imaging system according to an embodiment of the present disclosure.

FIG. 6 illustrates a result of an image superimposition performed by an imaging system according to an embodiment of the present disclosure.

Referring to FIG. 6, illustrates how the imaging system increases an image resolution. The left figure illustrates an image obtained by an existing imaging system and the right figure illustrates an image obtained by the imaging system 100 of FIG. 1. It is found that a result provided by two superimposed images (i.e., the first and second images of FIG. 1) in an imaging system according to an embodiment is better than that provided by an image without any overlay or superimposition. More particularly, attention should be drawn to borders of geometrical figures and to text at the bottom of each image. Image superimposition makes the borders sharper and the text clearer.

Figure 2:
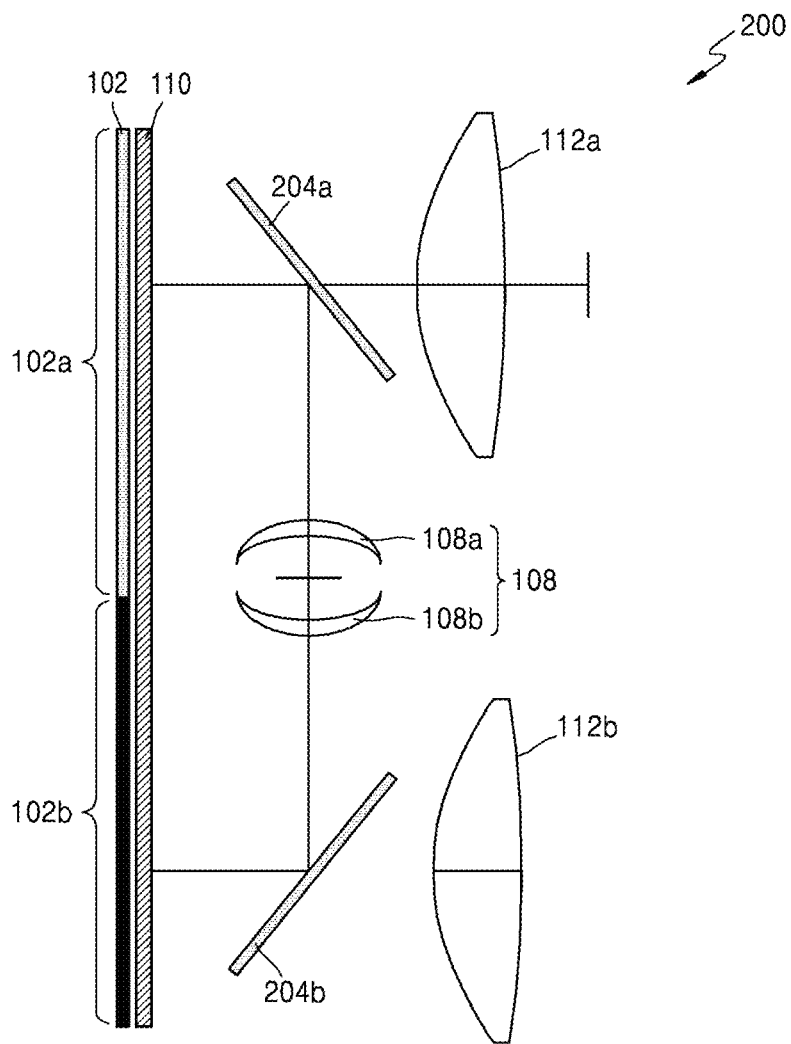
FIG. 2 is a schematic view of an imaging system according to an embodiment of the present disclosure.

FIG. 2 is a schematic view of an imaging system according to an embodiment of the present disclosure.

Referring to FIG. 2, an imaging system 200 may include the display 102 and first and second polarization beam splitters 204a and 204b. The display 102 may include the first half screen 102a and the second display half screen 102b.

In FIG. 2, elements denoted by the same reference numerals as those in FIG. 1 perform substantially the same functions and operations, and thus a detailed explanation thereof will not be given. Each of the first and second polarization beam splitters 204a and 204b may electrically operate in a mirroring state or a transparent state. When compared to FIG. 1, the first polarization beam splitter 204a may replace the first beam splitter 104a and the first optical shutter 106a, and the second polarization beam splitter 204b may replace the second beam splitter 104b and the second optical shutter 106b.

The arrangement of the first and second polarization beam splitters 204a and 204b may be the same as that of the first and second optical shutters 106a and 106b of FIG. 1. As for the operation principle of the first and second polarization beam splitters 204a and 204b, the mirroring state is similar to the closed state of the first and second optical shutters 106a and 106b, and the transparent state is similar to the opened state of the first and second optical shutters 106a and 106b. Other examples of the first and second polarization beam splitters 204a and 204b are well known in the prior art, and thus an explanation thereof will not be given. When the first and second polarization beam splitters 204a and 204b are used, the imaging system 200 may operate in first and second modes as follows.

In the first mode, the first polarization beam splitter 204a is in the transparent state and the second polarization beam splitter 204b is in the mirroring state. The display 102 may be configured to output first light beams characterizing a predetermined first image from the first display half screen 102a and to output second light beams characterizing a shifted second image from the second display half screen 102b. The shifted second image may be an image shifted by a sub-pixel relative to the predetermined first image. The second polarization beam splitter 204b may be configured to reflect the second light beams toward the first and second relay lenses 108a and 108b. The first and second relay lenses 108a and 108b may be configured to direct the second light beams to the first polarization beam splitter 204a. The first polarization beam splitter 204a may be configured to reflect the second light beams toward the retroreflective unit 110. The retroreflective unit 110 may be configured to transmit therethrough the first light beams and direct the first light beams to a first eye through the first polarization beam splitter 204a and the eyepiece (i.e., the first focusing lens 112a), and to reflect the second light beams, thereby merging the predetermined image and the second image into a final high-resolution image for the first eye.

In the second mode, the first polarization beam splitter 204a is in the mirroring state and the second polarization beam splitter 204b is in the transparent state. The display 102 may be configured to output the first light beams from the second display half screen 102b and to output the second light beams from the first display half screen 102a. The first polarization beam splitter 204a may be configured to reflect the second light beams toward the first and second relay lenses 108a and 108b. The first and second relay lenses 108a and 108b may be configured to direct the second light beams to the second polarization beam splitter 204b. The second polarization beam splitter 204b may be configured to reflect the second light beams toward the retroreflective unit 110. The retroreflective unit 110 may transmit therethrough the first light beams and direct the first light beams toward a second eye through the second polarization beam splitter 204b and the eyepiece (i.e., the second focusing lens 112b), and may reflect the second light beams, thereby merging the predetermined image and the shifted image into the final high-resolution image for the second eye.

Figure 3:
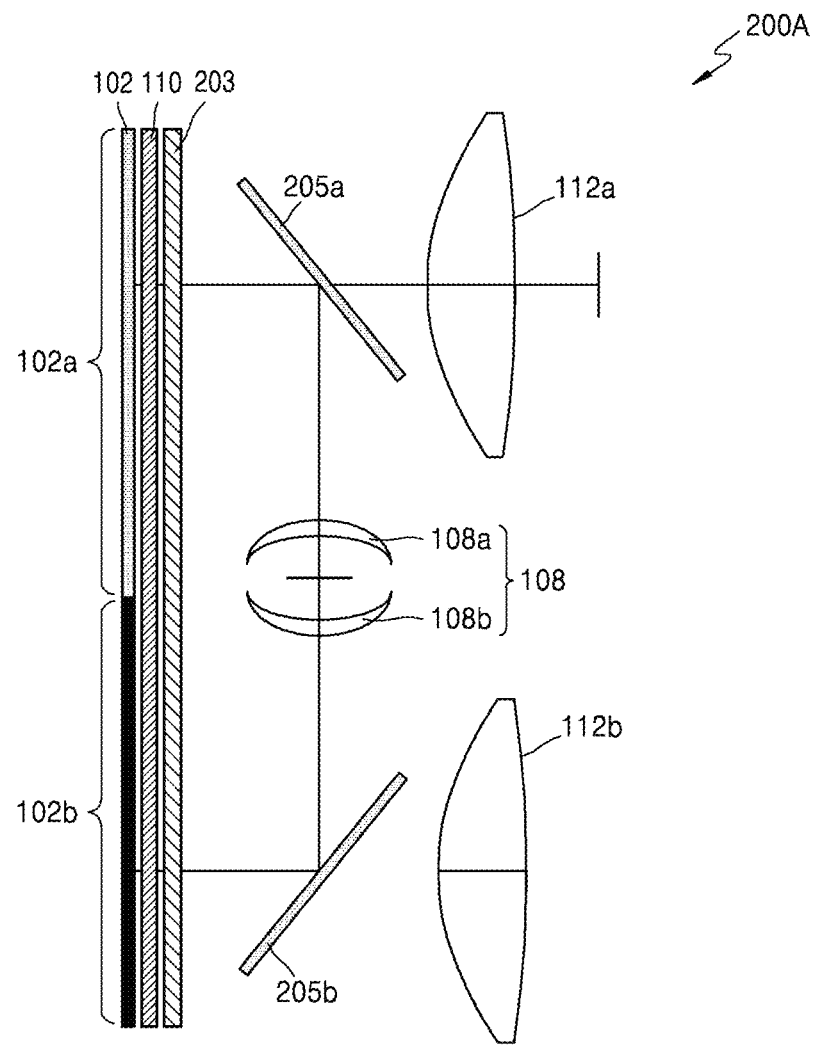
FIG. 3 illustrates a modification of an imaging system according to an embodiment of the present disclosure.

FIG. 3 illustrates a modification of an imaging system according to an embodiment of the present disclosure.

Referring to FIG. 3, in an imaging system 200A of FIG. 3, both first and second polarization beam splitters 205a and 205b may transmit p-polarization light and may reflect s-polarization light, or vice versa. The imaging system 200A may further include a retarder 203 located in front of the display 102. The retarder 203 may be configured to make first light beams s-polarized and second light beams p-polarized in a first mode, and to make the first light beams p-polarized and the second light beams s-polarized in a second mode. According to polarization states of the first and second light beams, each of the first and second polarization beam splitters 205a and 205b is in the mirroring state or the transparent state. In this case, p-polarization and s-polarization are given only as examples, and in other embodiments, other polarization states of the first and second light beams may be used as apparent to one of ordinary skill in the art.

In the first mode, the display 102 may be configured to output the first light beams from the first display half screen 102a and to output the second light beams from the second display half screen 102b. The second polarization beam splitter 205b may be configured to reflect the second light beams toward the first and second relay lenses 108a and 108b, and the first and second relay lenses 108a and 108b may be configured to direct the second light beams toward the first polarization beam splitter 205a. The first polarization beam splitter 205a may be configured to reflect the second light beams toward the retroreflective unit 110.

The retroreflective unit 110 may transmit therethrough the first light beams toward a first eye, and may reflect the second light beams to the first eye through the first polarization beam splitter 205a and the first focusing lens 112a, thereby merging a first image and a shifted second image into a final high-resolution image for the first eye.

In the second mode, the display 102 may be configured to output the second light beams from the first display half screen 102a and to output the first light beams from the second display half screen 102b. The first polarization beam splitter 205a may be configured to reflect the second light beams toward the first and second relay lenses 108a and 108b, and the first and second relay lenses 108a and 108b may be configured to direct the second light beams toward the second polarization beam splitter 205b. The second polarization beam splitter 205b may be configured to reflect the second light beams toward the retroreflective unit 110. The retroreflective unit 110 may be configured to transmit therethrough the first light beams to a second eye, and to reflect the second light beams toward the second eye through the second polarization beam splitter 205b and the second focusing lens 112b, thereby merging the first image and the shifted second image into the final high-resolution image for the second eye.

Various embodiments may be used in cases where it is necessary to provide user immersion into virtual reality for performing different tasks, such as three-dimensional (3D) modeling, navigation, and design. Imaging systems according to various embodiments may be applied to, for example, head-mounted imaging systems. Various embodiments may be implemented in different head-mounted devices, such as virtual reality (VR) glasses or helmets, which are currently popular in gaming and educational industries.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An imaging system comprising:
a display comprising a first display half screen and a second display half screen;
a retroreflective device provided on the display;
a first beam splitter facing the first display half screen;
a second beam splitter facing the second display half screen;
a first optical shutter located on a surface of the first beam splitter; and
a second optical shutter located on a surface of the second beam splitter,
wherein the imaging system is configured to alternately operate in a first mode and a second mode,
wherein, in the first mode, the first optical shutter is opened and the second optical shutter is closed,
wherein the display is configured to:
output first light beams characterizing a first image from the first display half screen, and
output, from the second display half screen, second light beams characterizing a second image shifted relative to the first image,
wherein the retroreflective device is configured to:
transmit the first light beams toward a first eye, and
reflect the second light beams toward the first eye, thereby merging the first and second images characterized by the first light beams and the second light beams into an image for the first eye,
wherein, in the second mode, the first optical shutter is closed and the second optical shutter is opened,
wherein the display is configured to:
output the first light beams from the second display half screen,
output the second light beams from the first display half screen, and
wherein the retroreflective device is configured to:
transmit the first light beams toward a second eye, and
reflect the second light beams toward the second eye, thereby merging the first and second images characterized by the first light beams and the second light beams into an image for the second eye.

2. The imaging system of claim 1, further comprising a relay lens located between the first beam splitter and the second beam splitter.

3. The imaging system of claim 2, wherein the relay lens comprises a pair of lenses disposed symmetrically to each other.

4. The imaging system of claim 1, wherein the shifted second image is shifted upward, downward, leftward, rightward, or diagonally relative to the first image.

5. The imaging system of claim 4, wherein the shifted second image is shifted by a sub-pixel of the display, relative to the first image.

6. The imaging system of claim 1, wherein the retroreflective device includes any one of a sheet-type retroreflector or a diffuser.

7. The imaging system of claim 6, wherein the sheet-type retroreflector comprises a plastic substrate, a semitransparent mirror coating provided on the plastic substrate, and a plastic cover layer covering the semitransparent mirror coating.

8. The imaging system of claim 7, wherein the semitransparent mirror coating is configured as a curved layer including semicircular cavities each filled with a glass ball.

9. The imaging system of claim 7, wherein the semitransparent mirror coating is configured as a curved layer including a plurality of embossed prisms on a surface of the semitransparent mirror coating, the surface facing the plastic substrate.

10. The imaging system of claim 6, wherein the sheet-type retroreflector comprises one glass or polymer layer including a plurality of truncated prisms or double-truncated prisms.

11. The imaging system of claim 1, further comprising a first focusing lens facing the first optical shutter and a second focusing lens facing the second optical shutter.

12. An imaging system comprising:
a display comprising a first display half screen and a second display half screen;
a retroreflective device provided on the display;
a first polarization beam splitter facing the first display half screen and electrically operable in a mirroring state or a transparent state; and
a second polarization beam splitter facing the second display half screen and electrically operable in the mirroring state or the transparent state,
wherein the imaging system is configured to alternately operate in a first mode and a second mode,
wherein, in the first mode, the first polarization beam splitter is in the transparent state and the second polarization beam splitter is in the mirroring state,
wherein the display is configured to:
output, from the first display half screen, first light beams characterizing a first image, and
output, from the second display half screen, second light beams characterizing a second image shifted relative to the first image, wherein the retroreflective device is configured to:
transmit the first light beams toward a first eye, and
reflect the second light beams toward the first eye, thereby merging the first and second images characterized by the first light beams and the second light beams into an image for the first eye,
wherein, in the second mode, the first polarization beam splitter is in the mirroring state and the second polarization beam splitter is in the transparent state,
wherein the display is configured to:
output the first light beams from the second display half screen, and
output the second light beams from the first display half screen, and
wherein the retroreflective device is configured to:
transmit the first light beams toward a second eye, and
reflect the second light beams toward the second eye, thereby merging the first and second images characterized by the first light beams and the second light beams into an image for the second eye.

13. The imaging system of claim 12, further comprising a relay lens provided between the first polarization beam splitter and the second polarization beam splitter.

14. The imaging system of claim 12, wherein the shifted second image is shifted by a sub-pixel of the display, relative to the first image.

15. The imaging system of claim 12, wherein the retroreflective device includes any one of a sheet-type retroreflector or a diffuser.

16. The imaging system of claim 15, wherein the sheet-type retroreflector comprises a plastic substrate, a semitransparent mirror coating provided on the plastic substrate, and a plastic cover layer covering the semitransparent mirror coating.

17. The imaging system of claim 16, wherein the semitransparent mirror coating is configured as a curved layer including semicircular cavities each filled with a glass ball.

18. The imaging system of claim 16, wherein the semitransparent mirror coating is configured as a curved layer including a plurality of embossed prisms on a surface of the semitransparent mirror coating, the surface facing the plastic substrate.

19. The imaging system of claim 15, wherein the sheet-type retroreflector comprises one glass or polymer layer including a plurality of truncated prisms or double-truncated prisms.

20. An imaging system comprising:
- a display comprising a first display half screen and a second display half screen configured to alternately emit first light beams and second light beams;
- a retroreflective device provided on the display;
- a retarder provided on the retroreflective device and electrically operable to provide a first or second polarization state of the first light beams and of the second light beams;
- a first polarization beam splitter facing the first display half screen and configured to transmit or reflect the first or second light beams depending on which light beams from among the first and second light beams are in the first or second polarization state; and
- a second polarization beam splitter facing the second display half screen and configured to transmit or reflect the first or second light beams depending on which light beams from among the first and second lights are in the first or second polarization state, wherein the imaging system is configured to alternately operate in a first mode and a second mode, wherein, in the first mode, the first light beams characterize a first image and the second light beams characterize a second image shifted relative to the first image, wherein the display is configured to:
- output the first light beams from the first display half screen, and
- output the second light beams from the second display half screen, wherein the retarder operates such that the first light beams are in the first polarization state and the second light beams are in the second polarization state, wherein the retroreflective device is configured to:
- transmit the first light beams toward a first eye, and
- reflect the second light beams toward the first eye, thereby merging the first and second images characterized by the first light beams and the second light beams into an image for the first eye, wherein, in the second mode, the display is further configured to:
- output the second light beams from the first display half screen, and
- output the first light beams from the second display half screen, wherein the retarder operates such that the first light beams are in the second polarization state and the second light beams are in the first polarization state, and wherein the retroreflective device is configured to:
- transmit the first light beams toward a second eye, and
- reflect the second light beams toward the second eye, thereby merging the first and second images characterized by the first light beams and the second light beams into an image for the second eye.

21. The imaging system of claim 13, wherein the relay lens comprises a pair of lenses disposed symmetrically to each other.

* * * * *